US006513862B2

(12) United States Patent
Dodson et al.

(10) Patent No.: US 6,513,862 B2
(45) Date of Patent: Feb. 4, 2003

(54) DOOR PANEL AND DOOR ASSEMBLY

(75) Inventors: Gordon Charles Dodson, Lewis Center, OH (US); Kyozaburo Takagi, Centerville, OH (US)

(73) Assignee: Fukuvi USA, Inc., Huber Heights, OH (US)

( * ) Notice: Subject to any disclaimer, the term of this patent is extended or adjusted under 35 U.S.C. 154(b) by 12 days.

(21) Appl. No.: 09/911,301

(22) Filed: Jul. 23, 2001

(65) Prior Publication Data

US 2002/0060472 A1 May 23, 2002

Related U.S. Application Data

(60) Provisional application No. 60/249,850, filed on Nov. 17, 2000.

(51) Int. Cl.[7] .............................. B60J 5/06; E06B 6/00; E06B 9/00

(52) U.S. Cl. ........................ 296/155; 296/147; 160/235

(58) Field of Search ................................ 296/155, 147, 296/148; 160/235

(56) References Cited

U.S. PATENT DOCUMENTS

| | | | | | |
|---|---|---|---|---|---|
| 1,888,162 | A | * | 11/1932 | Eklund | 160/235 |
| 2,257,513 | A | * | 9/1941 | Pilcher | 160/235 |
| 3,056,451 | A | * | 10/1962 | Federlin et al. | 160/235 |
| 3,359,594 | A | * | 12/1967 | Pastoor | 160/235 |
| 3,570,579 | A | * | 3/1971 | Matsushima | 160/235 |
| 4,222,428 | A | | 9/1980 | Scherer | |
| 4,380,260 | A | * | 4/1983 | Labelle | 160/235 |
| 4,532,973 | A | * | 8/1985 | DeFalco | 160/235 |
| 4,644,724 | A | | 2/1987 | Schijf | |
| 4,771,816 | A | * | 9/1988 | Clay, Jr. | 160/235 |
| 4,924,932 | A | * | 5/1990 | Esnault | 160/235 |
| 4,979,553 | A | * | 12/1990 | Lowry, III et al. | 160/235 |
| 5,238,283 | A | * | 8/1993 | Teigen | 296/155 |
| 5,474,118 | A | * | 12/1995 | Hoffman | 160/235 |
| 5,547,241 | A | * | 8/1996 | Villella et al. | 160/235 |
| 5,622,012 | A | * | 4/1997 | Schijf | 160/235 |
| 5,718,276 | A | * | 2/1998 | Rekret | 160/235 |
| 5,842,508 | A | * | 12/1998 | Krupke et al. | 160/235 |
| 5,857,510 | A | * | 1/1999 | Krupke et al. | 160/235 |
| 5,909,762 | A | * | 6/1999 | Denoual et al. | 160/235 |
| 6,041,846 | A | * | 3/2000 | Langlois | 160/201 |
| 6,098,696 | A | * | 8/2000 | Styra | 160/233 |
| 6,098,697 | A | * | 8/2000 | Krupke et al. | 160/232 |
| 6,129,132 | A | * | 10/2000 | Denoual et al. | 160/235 |

FOREIGN PATENT DOCUMENTS

| | | |
|---|---|---|
| CH | 634379 A5 | 1/1983 |

* cited by examiner

*Primary Examiner*—D. Glenn Dayoan
*Assistant Examiner*—H. Gutman
(74) *Attorney, Agent, or Firm*—Killworth, Gottman, Hagan & Schaeff, L.L.P.

(57) ABSTRACT

A door assembly is provided comprising a plurality of interlocked door panels. Each of the door panels defines a length dimension, a height dimension, and a thickness dimension. Each of the door panels also defines a female portion, a male portion, and a panel body portion. The female portion and the male portion are defined near opposite extremes of the height dimension. The panel body portion mechanically couples the female portion to the male portion. The female portion defines an inside diameter. The male portion defines an outside diameter. The inside diameter of the female portion is sized to accommodate the outside diameter of the male portion. Each of the door panels are interlocked to an adjacent one of the door panels via accommodation of a male portion of one of the panels within a female portion of another of the panels. The female portion is preferably a rigid metal, e.g., Aluminum, and the male and panel body portions are preferably a plastic material, e.g., polyvinyl chloride (PVC). The weight of a door assembly according to the present invention is minimized by forming a majority or substantial portion of each panel of the door assembly from a light weight plastic material (e.g., polyvinyl chloride (PVC)).

21 Claims, 4 Drawing Sheets

DOOR PANEL AND DOOR ASSEMBLY

CROSS-REFERENCE TO RELATED APPLICATIONS

This application claims the benefit of U.S. Provisional Application Serial No. 60/249,850, filed Nov. 17, 2000.

BACKGROUND OF THE INVENTION

The present invention relates to an improved, light weight and durable door assembly incorporating a specialized door panel design. More specifically, the present invention relates to door assemblies for multi-bay beverage trucks, rear-door delivery trucks, or other applications requiring a vertical sliding access door.

Vertical sliding access doors are commonly used in multi-bay beverage trucks and rear-door delivery trucks. Traditionally it has been difficult to reduce the weight of these types of doors and maintain door strength, rigidity, durability, and the like. As a result it is necessary to either require operators to open and close very heavy doors or provide supplemental door lift assemblies. Each of these options is problematic for a variety of reasons. Accordingly, there is a need for a light weight, easily manufacturable, durable and reliable door assembly.

BRIEF SUMMARY OF THE INVENTION

This need is met by the present invention wherein a door assembly is provided incorporating a specialized dual material door panel design. According to the present invention, as is described in detail herein, a door design is introduced that utilizes door panels including a metallic female member and a non-metallic or plastic male member. The resulting design is optimally rigid, durable, and lightweight By arranging the design such that the female member is a rigid metal (e.g., Aluminum) and the male member is a plastic material, a secure engagement between the male and female member may be maintained. The weight of a door assembly according to the present invention is minimized by forming a majority or substantial portion of each panel of the door assembly from a light weight plastic material (e.g., polyvinyl chloride (PVC)). Select portions of each panel are formed from a metallic material, e.g., aluminum, having more longitudinal rigidity than conventional Plastic to optimize the structural integrity of each panel and of the door assembly as a whole.

In accordance with one embodiment of the present invention, a door assembly comprising a plurality of interlocked door panels. Each of the door panels defines a length dimension, a height dimension, and a thickness dimension. Each of the door panels also defines a female portion, a male portion, and a panel body portion. The female portion and the male portion are defined near opposite extremes of the height dimension. The panel body portion mechanically couples the female portion to the male portion. The panel body portion is characterized by a lower density than the female portion. The female portion defines an inside diameter. The male portion defines an outside diameter. The inside diameter of the female portion is sized to accommodate the outside diameter of the male portion. Each of the door panels are interlocked to an adjacent one of the door panels via accommodation of a male portion of one of the panels within a female portion of another of the panels.

Preferably, the male portion and the panel body portion form an integral part of the door panel while the female portion defines a separate part of the door panel. Further, the volume of the panel body portion preferably exceeds the volume of the female portion. The panel body portion and the male portion may be formed from a plastic material, such as polyvinyl chloride (PVC), and the female portion may be formed from a metal, such as aluminum. The female portion and the male portion are preferably defined about respective parallel longitudinal axes extending along the length dimension of the door panel.

The panel body portion may define a channel therein and the female portion may define an extended base portion. The channel and the extended base portion preferably define dimensions that permit slidable insertion of the extended base portion into the channel portion. The slidable insertion of the extended base portion is characterized by frictional engagement of the extended base portion and the channel. One or more projections may be provided in the channel to enhance the frictional engagement of the extended base portion and the channel. The respective dimensions of the channel and the extended base portion may define an asymmetric key relationship.

The female portion, the male portion, and the panel body portion are configured such that accommodation of the male portion of one of the panels within the female portion of another of the panels defines a pivot axis about which the panels are free to pivot relative to one another. The female portion may define a leading edge and the male portion and the panel body portion may define a recess in which the leading edge is free to move as the panels pivot relative to one another.

In accordance with another embodiment of the present invention, a sliding access door assembly is provided comprising a plurality of interlocked door panels supported along parallel door tracks by a plurality of supporting wheel assemblies engaging individual ones of the interlocked door panels. Each of the door panels are interlocked to an adjacent one of the door panels via accommodation of a male portion of one of the panels within a female portion of another of the panels. Each of the male portions further defines an inside diameter sized to accommodate an axle of one of the supporting wheel assemblies. Each of the supporting wheel assemblies is secured to one of the interlocked door panels via insertion of an axle of one of the supporting wheel assemblies within a corresponding inside diameter of one of the male portions.

The door tracks typically define a travel path including a curved portion. Preferably, the female portion, the male portion, and the panel body portion are configured such that accommodation of the male portion of one of the panels within the female portion of another of the panels defines a pivot axis about which the panels are free to pivot relative to one another to an extent sufficient to permit transit of the door assembly through the curved portion of the travel path.

In accordance with yet another embodiment of the present invention, a transit vehicle is provided. The transit vehicle includes at least one storage bay enclosed by and accessed through a sliding access door assembly comprising a plurality of interlocked door panels supported along parallel door tracks by a plurality of supporting wheel assemblies engaging individual ones of the interlocked door panels. Each of the supporting wheel assemblies is secured to one of the interlocked door panels via insertion of an axle of one of the supporting wheel assemblies within a corresponding inside diameter of one of the male portions.

Accordingly, it is an object of the present invention to provide a door design that is optimally rigid, durable, and lightweight and a transit vehicle incorporating such a design.

Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
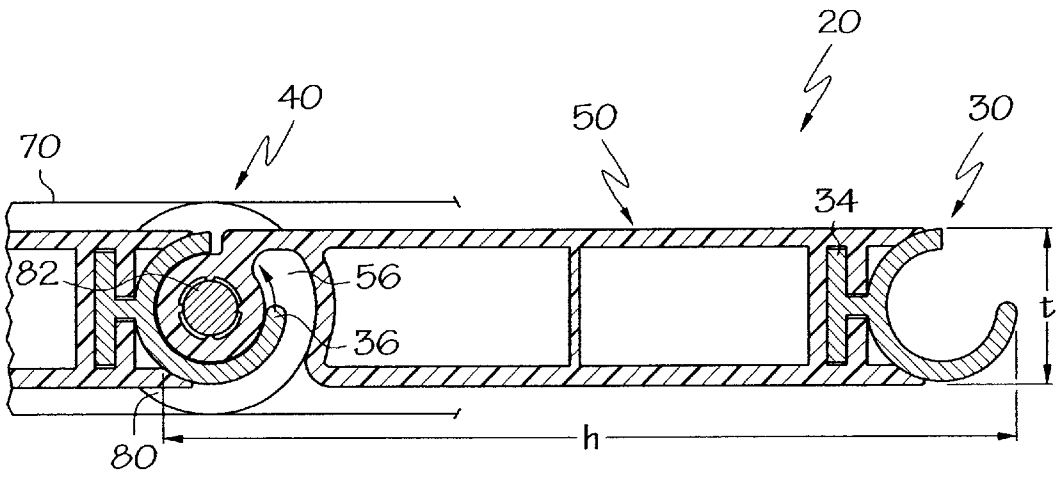
FIG. 1 is a cross-sectional illustration of a pair of interlocked door panels according to one embodiment of the present invention.
Figure 8:
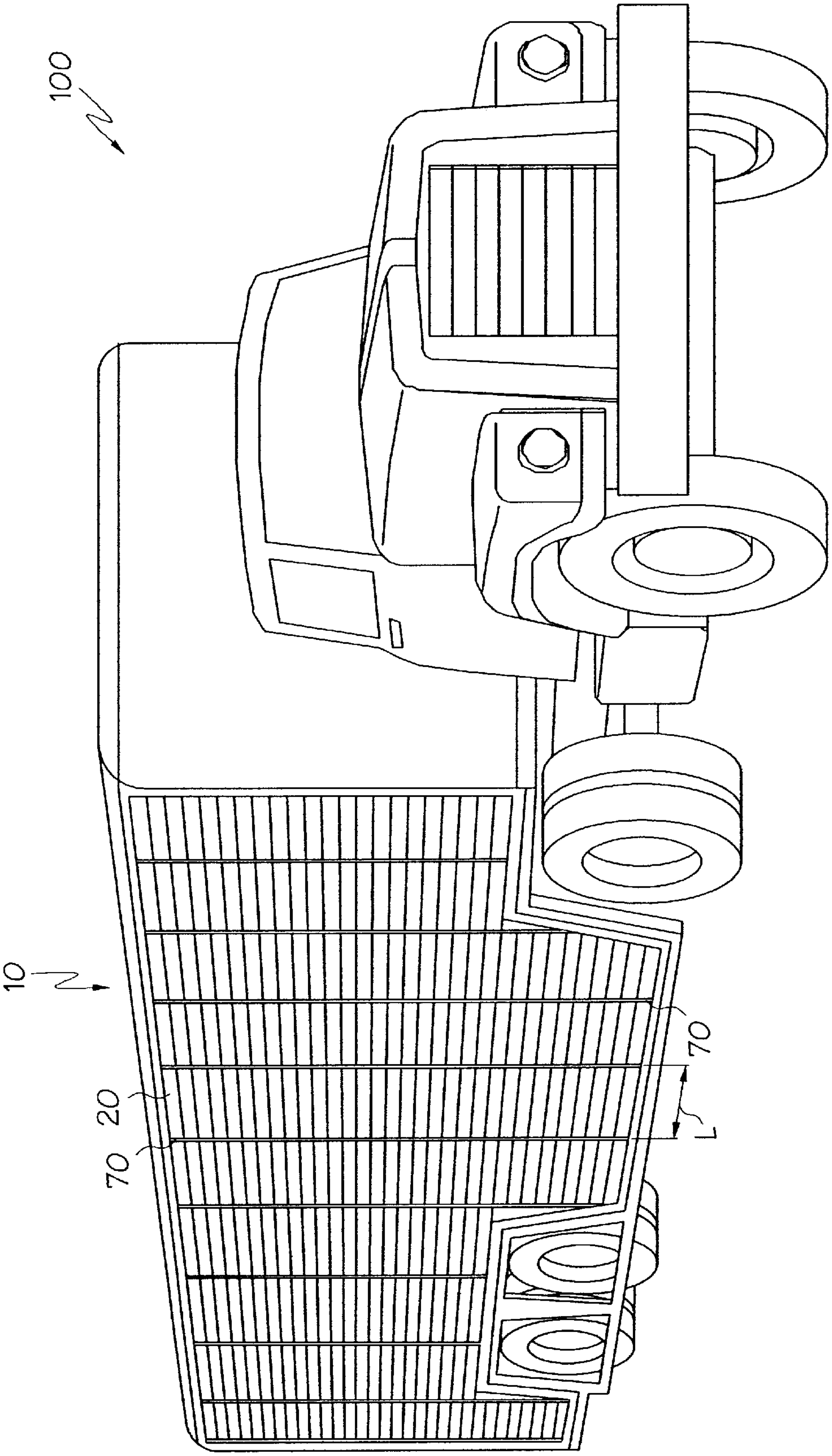
FIG. 8 is an illustration of a transit vehicle and sliding access door assembly according to the present invention.

Referring initially to FIGS. 1–3 and 8 respective portions of a door assembly 10 according to one embodiment of the present invention are illustrated. A plurality of door assemblies 10 are illustrated in FIG. 8. Each door assembly 10 comprises a plurality of interlocked door panels 20. One complete door panel 20 and a portion of another door panel 20 are illustrated in FIG. 1. Each of the door panels 20 defines a female portion 30, a male portion 40 and a panel body portion 50. To aid in the description and definition of the present invention, each door panel 20 is said to define a length dimension 1, a height dimension h, and a thickness dimension t. The height h and thickness t are clearly illustrated in FIG. 1. The length l is illustrated in FIG. 8.

The female portion 30 and the male portion 40 are defined near opposite extremes of the height dimension h of the door panel 20. The panel body portion 50, which is formed integrally with the male portion 40, mechanically couples the female portion 30 to the male portion 40. For the purposes of defining and describing the present invention, it is noted that integral portions or parts formed integrally with each other are "integral" in the sense that they cannot be distinguished from each other merely by identifying a physical discontinuity or surface boundary between the portions of material forming the parts at issue. In contrast, in the case of "separate" parts, physical discontinuities exist between the parts. For example, separate parts may abut each other or be joined or adhered to each other but will still define distinct surfaces defining the extent of each part. Typically, as is the case with the panel body portion 50 and the integrally formed male portion 40 of the door panel 20 of FIG. 1, the integral portions or parts are formed from a common material in a common manufacturing step and the resulting body incorporating the portions does not define any definite physical discontinuities or surface boundaries between the portions. In contrast, the door panel 20 of FIG. 1 also illustrates a female portion 30 that is separate from, but connected to, the panel body portion 50. Further, it is noted that minor portions of the door panel 20 may extend beyond the female or male portions thereof for aesthetic or functional purposes.

To minimize the overall weight or mass of the door panel 20 while maintaining sufficient strength, rigidity, and durability, the panel body portion 50 and the male portion 40, the combined size of which significantly exceeds that of the female portion 30, are formed from a material having a significantly lower density than is the female portion 30. For example, the panel body portion 50 and the male portion 40 may be formed from PVC or another suitable plastic material and the female portion 30 may be formed from aluminum or another rigid metal.

Figure 2:
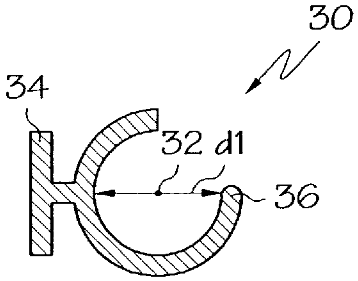
FIG. 2 is a cross-sectional illustration of a female door panel portion of the door panel illustrated in FIG. 1.
Figure 3:
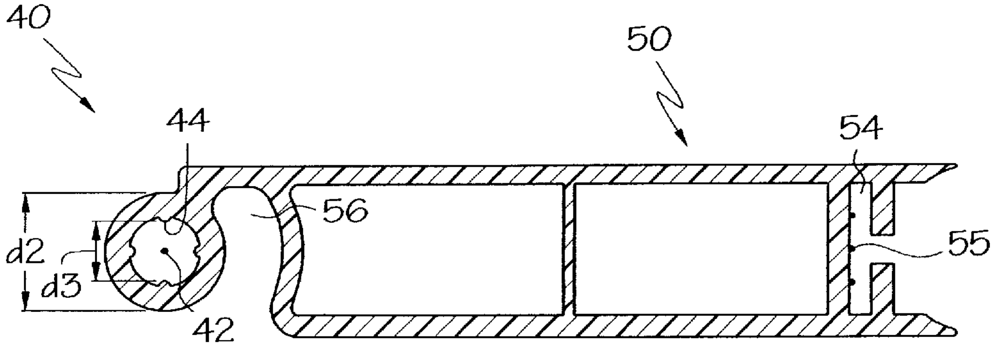
FIG. 3 is a cross-sectional illustration of a male door panel portion and a panel body door panel portion of the door panel illustrated in FIG. 1.

As is illustrated in FIGS. 2 and 3, the female portion 30 defines an inside diameter $d_1$ and the male portion 40 defines an outside diameter $d_2$. The inside diameter $d_1$ of the female portion 30 is sized to accommodate the outside diameter $d_2$ of the male portion 40. In this manner, each of the door panels 20 may be interlocked to an adjacent door panels 20 via accommodation of a male portion 40 of one of the panels within a female portion 30 of another of the panels. The resulting design is optimally rigid, durable, and lightweight because the male portion 40 and the panel body portion 50 are formed of lightweight plastic and the female portion 30 is formed of a rigid metal.

The female portion 30 and the male portion 40 are defined about respective parallel longitudinal axes 32, 42 extending along the length dimension l of the door panel 20. Similarly, the panel body portion 50 extends along the length dimension l of the door panel 20. Preferably, the female portion 30, the male portion 40, and the panel body portion 50 extend continuously along the length dimension l of the door panel 20. However, it is noted that openings, windows, slots or other discontinuities could be formed in the door panel 20 without departing from the scope of the present invention. In one embodiment of the present invention, the length l is about 100 cm, the height h is about 75 mm, and the thickness t is about 14 mm.

Referring again to FIGS. 1–3, the manner in which the female portion 30 may be secured to the male portion 40 and the panel body portion 50 is illustrated. The panel body portion 50 defines a channel 54 therein and the female portion 30 defines an extended base portion 34. The channel 54 and the extended base portion 34 define dimensions that permit slidable insertion of the extended base portion 34 into the channel portion 54, as is illustrated in FIG. 1. The slidable insertion of the extended base portion 34 is characterized by frictional engagement of the extended base portion 34 and the channel 54. Typically, the usual non-uniformities present in extruded plastic materials and the resulting variation in the straightness of the channel 54, as compared to the metallic base portion 34, will be sufficient to provide the frictional engagement necessary to secure the base portion 34 in the channel 54. However, referring to FIG. 3, one or more plastic projections 55 may be provided in the channel 54 to enhance the frictional engagement of the extended base portion 34 and the channel 54.

To facilitate movement of the door assembly 10 along a curved travel path, such as that commonly utilized in sliding access door applications, the female portion 30, the male portion 40, and the panel body portion 50 are configured such that accommodation of the male portion 30 of one of the panels 20 within the female portion 40 of another of the panels 20 defines a pivot axis about which the panels 20 are free to pivot relative to one another. Specifically, as is illustrated in FIG. 1, the female portion 30 defines a leading edge 36 and the male portion 40 and the panel body portion 50 define a recess 56 in which the leading edge 36 is free to move as the panels 20 pivot relative to one another.

Figure 4:
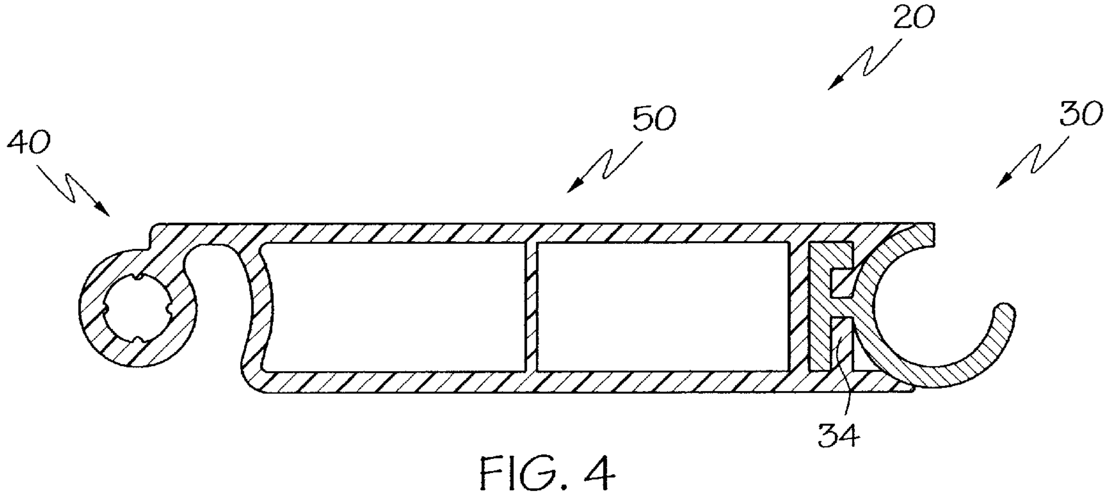
FIGS. 4–7 are cross-sectional illustrations of some alternative door panel arrangements according to the present invention.
Figure 5:
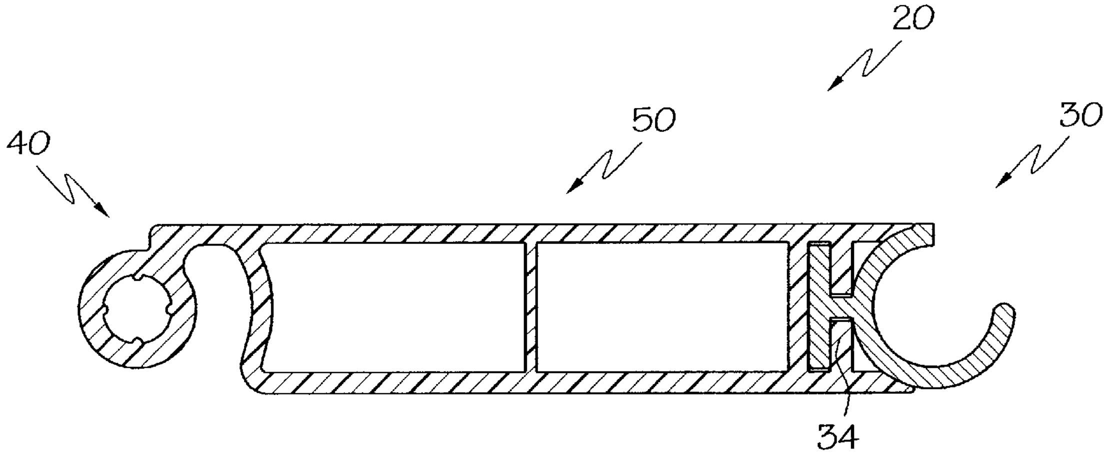
Figure 6:
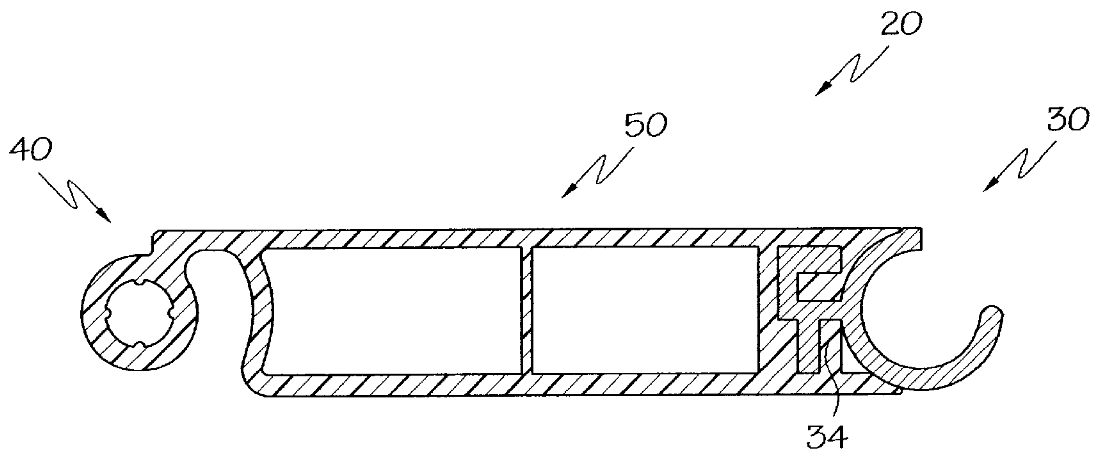
Figure 7:
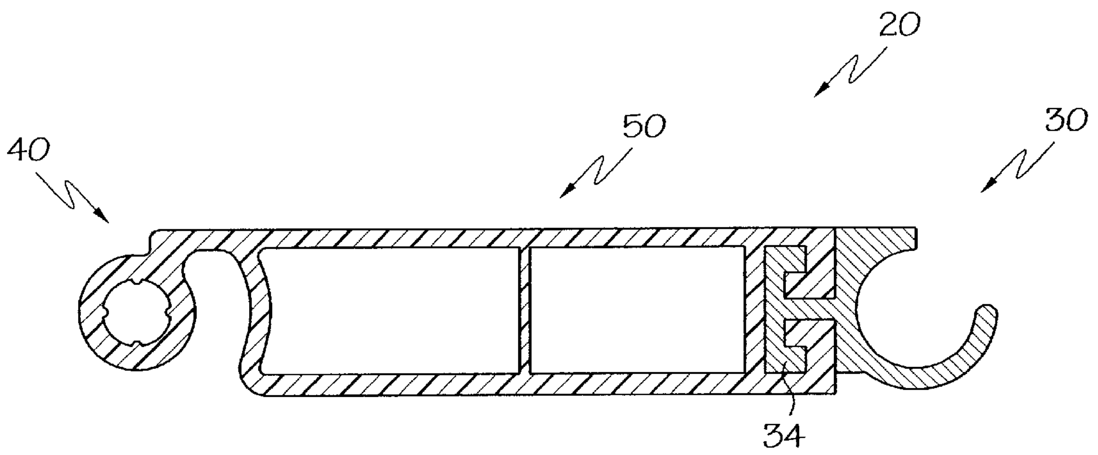

Alternative panel arrangements are illustrated in FIGS. 4–7. As is illustrated in FIGS. 4 and 6, the respective dimensions of the channel 54 and the extended base portion 34 may be arranged to define an asymmetric key relationship. In this manner, insertion of the base portion 34 into the channel 54 in an incorrect orientation is prevented. In FIGS. 4–7, the profile of the female portion 30 and the extended base portion 34, and the manner in which the panel body portion 50 abuts the female portion 30 is varied, as compared to the arrangement of FIGS. 1–3.

Referring now to FIG. 8, a transit vehicle 100 is illustrated and includes a plurality of storage bays enclosed by and accessed through respective sliding access door assemblies 10. For the purposes of defining and describing the present invention, it is noted that a transit vehicle 100 may comprise a trailer, a tractor/trailer combination, or any other type of vehicle including at least one storage bay enclosed by and accessed through a sliding access door.

Referring to FIGS. 1, 3, and 8, each sliding access door assembly 10 comprises a plurality of interlocked door panels 20 supported along parallel door tracks 70 by a plurality of supporting wheel assemblies 80 engaging individual ones of the interlocked door panels 20. Each of the door panels 20 defines a female portion 30, a male portion 40, and a panel body portion 50. As is noted above, each of the door panels 20 are interlocked to an adjacent one of the door panels 20 via accommodation of a male portion 40 of one of the panels 20 within a female portion 40 of another of the panels 20. Each of the male portions 40 further defines an inside diameter $d_3$ sized to accommodate an axle 82 of one of the supporting wheel assemblies 80. Thus, each of the supporting wheel assemblies 80 may be secured to a door panel 20 by inserting an axle 82 of a wheel assembly 80 within an inside diameter of a male portion 40 of a door panel 20. One or more axle securing projections 44 may be provided on the inside diameter of the male portion 40 to help secure the axle 82 therein. Typically, the projections 44 are formed as an integral part of the male portion and of the same material as the male portion 40.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A door assembly comprising a plurality of interlocked door panels, wherein:

each of said door panels defines a length dimension, a height dimension, and a thickness dimension;

each of said door panels defines a female portion, a male portion, and a panel body portion;

said female portion and said male portion are defined near opposite extremes of said height dimension;

said male portion and said panel body portion form an integral part of said door panel and said female portion defines a separate part of said door panel;

said panel body portion mechanically couples said female portion to said male portion;

said panel body portion and said male portion are formed from a material characterized by a lower density than a material forming said female portion;

said female portion is formed from a material characterized by a higher rigidity than a material forming said male portion and said body portion;

said female portion defines an inside diameter;

said male portion defines an outside diameter;

said inside diameter of said female portion is sized to accommodate said outside diameter of said male portion; and each of said door panels are interlocked to an adjacent one of said door panels via accommodation of a male portion of one of said panels within a female portion of another of said panels.

2. A door assembly comprising a plurality of interlocked door panels, wherein:

each of said door panels defines a length dimension, a height dimension, and a thickness dimension;

each of said door panels defines a female portion, a male portion, and a panel body portion;

said female portion and said male portion are defined near opposite extremes of said height dimension;

said panel body portion mechanically couples said female portion to said male portion;

said panel body portion and said male portion are formed from a material characterized by a lower density than a material forming said female portion;

said female portion defines an inside diameter;

said male portion defines an outside diameter;

said inside diameter of said female portion is sized to accommodate said outside diameter of said male portion; and each of said door panels are interlocked to an adjacent one of said door panels via accommodation of a male portion of one of said panels within a female portion of another of said panels.

3. A door assembly as claimed in claim 2 wherein a volume of said panel body portion exceeds a volume of said female portion.

4. A door assembly as claimed in claim 2 wherein said panel body portion and said male portion are formed from a plastic material and wherein said female portion is formed from a metal.

5. A door assembly as claimed in claim 4 wherein said plastic material comprises polyvinyl chloride.

6. A door assembly as claimed in claim 4 wherein said female portion comprises aluminum.

7. A door assembly as claimed in claim 2 wherein said male portion and said panel body portion form an integral part of said door panel and wherein said female portion defines a separate part of said door panel.

8. A door assembly as claimed in claim 2 wherein a combined volume of said panel body portion and said male portion exceeds a volume of said female portion.

9. A door assembly as claimed in claim 2 wherein said female portion and said male portion are defined about respective parallel longitudinal axes extending along said length dimension of said door panel.

10. A door assembly as claimed in claim 9 wherein said female portion and said male portion extend continuously along said length dimension of said door panel.

11. A door assembly as claimed in claim 9 wherein said panel body portion extends along said length dimension of said door panel.

12. A door assembly as claimed in claim 11 wherein said panel body portion extends continuously along said length dimension of said door panel.

13. A door assembly as claimed in claim 2 wherein:

said panel body portion defines a channel therein;

said female portion defines an extended base portion; and said channel and said extended base portion define dimensions that permit slidable insertion of said extended base portion into said channel.

14. A door assembly as claimed in claim 13 wherein said slidable insertion of said extended base portion is characterized by frictional engagement of said extended base portion and said channel.

15. A door assembly as claimed in claim 14 wherein one or more projections are provided in said channel to enhance said frictional engagement of said extended base portion and said channel.

16. A door assembly as claimed in claim 14 wherein said respective dimensions of said channel and said extended base portion define an asymmetric key relationship.

17. A door assembly as claimed in claim 2 wherein said female portion, said male portion, and said panel body portion are configured such that the accommodation of said male portion of the one of said panels within said female portion of the other of said panels defines a pivot axis about which said panels are free to pivot relative to one another.

18. A door assembly as claimed in claim 17 wherein said female portion defines a leading edge and said male portion and said panel body portion define a recess in which said leading edge is free to move as said panels pivot relative to one another.

19. A sliding access door assembly comprising a plurality of interlocked door panels supported along parallel door tracks by a plurality of supporting wheel assemblies engaging individual ones of said interlocked door panels, wherein:

each of said door panels defines a length dimension, a height dimension, and a thickness dimension;

each of said door panels defines a female portion, a male portion, and a panel body portion;

said female portion and said male portion are defined near opposite extremes of said height dimension;

said panel body portion mechanically couples said female portion to said male portion;

said panel body portion and said male portion are characterized by a lower density than a material forming said female portion;

said female portion defines an inside diameter;

said male portion defines an outside diameter;

said inside diameter of said female portion is sized to accommodate said outside diameter of said male portion;

each of said door panels are interlocked to an adjacent one of said door panels via accommodation of a male portion of one of said panels within a female portion of another of said panels;

each of said male portions further defines an inside diameter;

said inside diameter of said male portion is sized to accommodate an axle of one of said supporting wheel assemblies; and each of said supporting wheel assemblies is secured to one of said interlocked door panels via insertion of an axle of one of said supporting wheel assemblies within a corresponding inside diameter of one of said male portions.

20. A sliding access door assembly as claimed in claim 19 wherein:

said door tracks define a travel path including a curved portion; and said female portion, said male portion, and said panel body portion are configured such that the accommodation of said male portion of the one of said panels within said female portion of the other of said panels defines a pivot axis about which said panels are free to pivot relative to one another to an extent sufficient to permit transit of said door assembly through said curved portion of said travel path.

21. A transit vehicle including at least one storage bay enclosed by and accessed through a sliding access door assembly comprising a plurality of interlocked door panels supported along parallel door tracks by a plurality of supporting wheel assemblies engaging individual ones of said interlocked door panels, wherein:

each of said door panels defines a length dimension, a height dimension, and a thickness dimension;

each of said door panels defines a female portion, a male portion, and a panel body portion;

said female portion and said male portion are defined near opposite extremes of said height dimension;

said panel body portion mechanically couples said female portion to said male portion;

said panel body portion and said male portion are characterized by a lower density than a material forming said female portion;

said female portion defines an inside diameter;

said male portion defines an outside diameter;

said inside diameter of said female portion is sized to accommodate said outside diameter of said male portion;

each of said door panels are interlocked to an adjacent one of said door panels via accommodation of a male portion of one of said panels within a female portion of another of said panels;

each of said male portions further defines an inside diameter;

said inside diameter of said male portion is sized to accommodate an axle of one of said supporting wheel assemblies; and each of said supporting wheel assemblies is secured to one of said interlocked door panels via insertion of an axle of one of said supporting wheel assemblies within a corresponding inside diameter of one of said male portions.

* * * * *